US012225243B2

(12) United States Patent
Beswick et al.

(10) Patent No.: US 12,225,243 B2
(45) Date of Patent: *Feb. 11, 2025

(54) INTERACTIVE VIDEO-BASED SPEED-DATING PLATFORM AND SYSTEM FOR PROVIDING AN IMMERSIVE ONLINE-STREAMING PRODUCTION

(71) Applicant: Couple.com, Inc, Basking Ridge, NJ (US)

(72) Inventors: Ryan Beswick, Allendale, NJ (US); Colleen Joyce, Basking Ridge, NJ (US)

(73) Assignee: Couple.com, Inc, Basking Ridge, NJ (US)

( * ) Notice: Subject to any disclaimer, the term of this patent is extended or adjusted under 35 U.S.C. 154(b) by 242 days.

This patent is subject to a terminal disclaimer.

(21) Appl. No.: 18/059,911

(22) Filed: Nov. 29, 2022

(65) Prior Publication Data

US 2023/0088883 A1 Mar. 23, 2023

Related U.S. Application Data

(63) Continuation of application No. 17/744,172, filed on May 13, 2022, now Pat. No. 11,516,519, which is a continuation-in-part of application No. 17/375,098, filed on Jul. 14, 2021, now abandoned.

(51) Int. Cl.
| | | |
|---|---|---|
| *H04N 21/2187* | (2011.01) | |
| *H04N 21/431* | (2011.01) | |
| *H04N 21/472* | (2011.01) | |
| *H04N 21/4788* | (2011.01) | |

(52) U.S. Cl.
CPC ....... *H04N 21/2187* (2013.01); *H04N 21/431* (2013.01); *H04N 21/472* (2013.01); *H04N 21/4788* (2013.01)

(58) Field of Classification Search
CPC ....... G06F 9/45558; G06F 2009/45595; H04L 65/4076; H04L 65/4046; H04L 12/18; H04L 67/26; H04N 7/00; H04N 21/2668; H04N 21/4788; H04N 21/214; H04N 21/21805; H04N 21/2187; H04N 21/472; H04N 21/47205; H04N 21/47217;
(Continued)

(56) References Cited

U.S. PATENT DOCUMENTS

| | | | | |
|---|---|---|---|---|
| 11,012,498 | B1* | 5/2021 | Hinnant | ........... H04L 67/08 |
| 2009/0307610 | A1* | 12/2009 | Ryan | ........... H04N 7/173 |
| | | | | 715/756 |

(Continued)

*Primary Examiner* — Kostas J Katsikis
(74) *Attorney, Agent, or Firm* — Michael L. Greenberg, Esq.; Greenberg & Lieberman, LLC

(57) ABSTRACT

A method for hosting and exhibiting virtual speed-dates between paired participants over a web-based platform for interactive display to viewers in a serialized show format. The platform is configured to simultaneously depict all participants live streams to viewers simultaneously. Speed-dates are limited by a timer, whereby, upon expiration of the timer, the participants encounter a selection screen in which they decide to "couple," "connect," or "cut," indicating their level of desire in seeing their date again in a subsequent episode of the show. Participants are eliminated from the group of participants in accordance with the amount of people with whom they "couple" or "connect."

14 Claims, 6 Drawing Sheets

(58) Field of Classification Search
CPC ...... H04N 21/431; H04H 20/00; H04H 60/00; G06N 5/02
See application file for complete search history.

(56) References Cited

U.S. PATENT DOCUMENTS

| | | | | |
|---|---|---|---|---|
| 2011/0252340 | A1* | 10/2011 | Thomas | G06Q 50/01 |
| | | | | 715/756 |
| 2017/0346926 | A1* | 11/2017 | Charters | G06F 9/453 |
| 2018/0352303 | A1* | 12/2018 | Siddique | H04L 65/1069 |
| 2021/0037020 | A1* | 2/2021 | Cook | G06F 16/9535 |

* cited by examiner

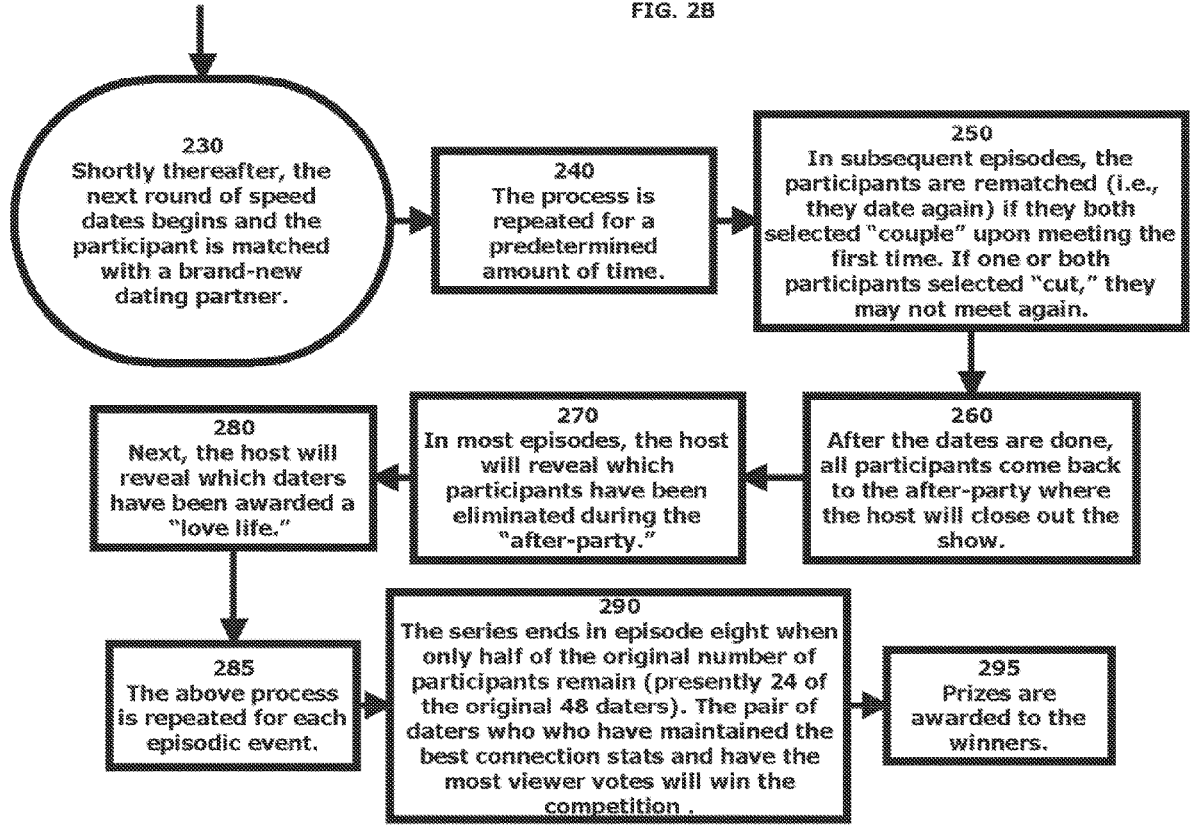

INTERACTIVE VIDEO-BASED SPEED-DATING PLATFORM AND SYSTEM FOR PROVIDING AN IMMERSIVE ONLINE-STREAMING PRODUCTION

CONTINUITY

This application is a continuation of continuation-in-part application Ser. No. 17/744,172, filed on May 13, 2022, and of non-provisional patent application Ser. No. 17/375,098, filed on Jul. 14, 2021, and priority is claimed thereto.

FIELD OF THE PRESENT INVENTION

The present invention relates to the field of internet-based platforms. More specifically, it relates to a platform and system configured to facilitate video-based speed dates while simultaneously providing a mechanism by which an audience may (a) watch the dates in real-time and (b) provide live feedback to the date participants.

BACKGROUND OF THE PRESENT INVENTION

It is human nature to be interested in relationship dynamics. People are commonly known to gossip about the relationships of friends and strangers alike. Furthermore, many individuals find following the relationships of celebrities a fun pastime, and they consume copious amounts of media dedicated to tracking the love lives of famous folks. In fact, this concept has inspired several popular television productions, such as The Bachelor, The Bachelorette, Love Island, and many more. These particular productions are quite popular within their respective local cultures, and many other countries around the world produce their own dating television shows that are enjoyed by millions of viewers.

Unfortunately, these shows tend to require a big time commitment from viewers, as they are designed to last for an entire season of television. Additionally, these shows are generally limited to conventional television viewership, providing little to no means by which the audience may vote on outcomes of the show, provide feedback, or otherwise (directly or indirectly) interact with the participants. If there were a way in which the audience could interact with the show itself, as well as with the participants, the concept could be made more immersive and therefore more entertaining for the viewers.

Online dating has grown in popularity in recent years, and individuals have warmed to the concept of meeting potential partners online. An assortment of popular matching websites and platforms currently exist on the market to facilitate the matching of strangers to one another. However, these platforms are strictly for those seeking to date; they are not oriented toward spectators, nor are they tailored specifically (and solely) for video-based dating in a television-show-like format. If there were a service that could combine these two elements, single people could find meaningful mates, and the entertainment value of their "first dates" could be captured for a viewing audience.

Video conferencing has gained traction in recent years given that (a) more people have reliable internet connections and (b) the hardware to support video streaming has become mainstream. Some dating platforms enable users to create brief asynchronous video messages and/or allow them to make direct communication via video calls. However, no existing dating platform enables outside viewers to watch these videos and video calls in a television-show-like manner, let alone permit them to provide live and interactive feedback to the daters.

Thus, there is a need for a new system and platform that successfully matches single individuals while simultaneously enabling an audience to watch their video-based internet dates. Such a system preferably includes interactive components that enable viewers to interact/communicate with participants during and after their video dates. Additionally, such a system preferably employs at least one secured server-computer, disposed in connection with the internet, to host multiple video calls for the purpose of simultaneous (concurrent) speed dates, each of which is viewable to the viewing audience from the first-person perspective of participants themselves.

While some prominent online-dating platforms provide a mechanism by which viewers may watch online video dates (such as Meet Group™ via their MeetMe™ product), these dates are isolated, one-off events. In contrast, the present invention provides an event-based show in which multiple (24 or more) individuals come together to date each other at a specific date and time. These events are shown in a series, similar to a serialized television show, and the platform provides a mechanism for the viewers to interact directly with participants. Additionally, unlike present audience mechanisms for viewing blind dates, the present invention's platform enables viewers to influence (through votes) which daters are eliminated from the next round of speed dates. Similarly, unlike other platforms, the platform and system of the present invention may deem one couple "champions" at the end of a season of shows, and this duo may be awarded a cash prize, vacation, or similar perk for participating.

Further, it is known that conventional streaming platforms have issues with latency. The aforementioned platforms deliberately sacrifice latency for video quality. Therefore, in a typical application that offers live streaming such as YouTube™ or Instagram™ live, viewers see/hear the media 10-45 seconds behind real-time. This high degree of latency is not prudent for a live interactive game show as posited by the system and platform of the present invention. Additionally, as a result of this latency, two-way interactivity becomes extremely out-of-sync and communication between parties loses its relevance and meaning because of the delays between viewers and content creators seeing each other's reactions.

In contrast, platforms equipped with low-latency, such as Zoom™, Google Meet™, Skype™, and similar platforms have limited room sizes. The quantity of participants/viewers are limited to a small number, generally around 50 per room. In contrast to the platform and system of the present invention, in conventional web conference platforms with low latency, viewers or participants are either locked into a single view of the event where they hear all participants or they are put into a breakout room where they can only see those in the breakout room. Therefore, current platforms, both those with low latency and those with deliberate delays are unsuitable to a live, interactive show with numerous viewers online, and a new system and platform is needed.

The platform of the present invention is configured to deliver on all fronts: low latency, large number of viewers, and multiple views of the room. Via the system and platform of the present invention, thousands of viewers can watch an event with sub-half-second latency enabling cutting-edge interactivity between content creators and viewers. Viewers can switch their perspective of the event to that of any of the cast members at any time, allowing them to see all the daters in the room, but hear only the dater in the date that they're focused on.

SUMMARY OF THE PRESENT INVENTION

The present invention is an internet-based platform and system configured to facilitate the live production of an interactive speed-dating show. The platform is preferably accessible via an internet browser or mobile-device application, and is designed to enable viewers (the audience) to witness a series of speed dates enacted via video calls from the perspective of the participants (the daters/datees) themselves. The platform enables the audience to change their view between participants' first-person perspectives at-will at any time during the live speed-date interaction (i.e., during a speed date between Participant A and Participant B, the viewer may opt to view the date from Participant A's perspective or Participant B's perspective as though the viewer, too, were sitting at a virtual "table" during the date). Similarly, the platform enables the viewer to switch to a different virtual "table" at any time to witness a different speed date being executed simultaneously by different participants. The platform of the present invention is preferably configured to display videos of all 24 participants at the event at once, with a majority of the videos shown in small, thumbnail-sized videos. The viewer selects a pair of daters on which to focus, and these videos are prominently displayed—enlarged—in the center of the browser window.

The platform of the present invention is configured to enable the audience to provide real-time feedback to the participants in the form of "likes," comments, and votes. This feedback is seen by the participants, and may help inform their decision(s) about which dating partner(s) they prefer best. After each speed date, participants are required to address the audience directly, ask for feedback, provide their insight as to what went well on the date, and comment on what they liked (or did not like) about their dating partner. Each participant is then required to mark their date as either "couple," "connect," or "cut."

Selecting "couple" indicates that they're interested in pursuing the dating partner romantically, and selecting "cut" removes the participant from rotation and indicates the dater isn't interested in pursuing the dating partner at all. Selecting "connect" means that the dater is interested in pursuing their dating partner for friendship. When daters select "cut," the platform may maintain the possibility that the couple will be paired together again on a date in the future, despite their selection.

The following brief and detailed descriptions of the drawings are provided to explain possible embodiments of the present invention, but are not provided to limit the scope of the present invention as expressed herein this summary section.

BRIEF DESCRIPTION OF THE DRAWINGS

The accompanying drawings, which are incorporated herein and form a part of the specification, illustrate the present invention, and, together with the description, further serve to explain the principles of the invention and to enable a person skilled in the pertinent art to make and use the invention.

The present invention will be better understood with reference to the appended drawing sheets, wherein:

FIG. 2B is a continuation of the flow chart of FIG. 2A.

DETAILED DESCRIPTION OF THE PREFERRED EMBODIMENT

The present specification discloses one or more embodiments that incorporate the features of the invention. The disclosed embodiment(s) merely exemplify(ies) the invention. The scope of the invention is not limited to the disclosed embodiment(s).

References in the specification to "one embodiment," "an embodiment," "an example embodiment," etc., indicate that the embodiment described may include a particular feature, structure, or characteristic; however, every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention is a platform, system, and method of use thereof for the execution and exhibition of an online speed-dating show. The preferred embodiment of the present invention employs a platform (10) that is hosted to a website to facilitate the connection of participants (daters) to each other and to audience members (viewers). An audio-video connection is established over at least one secured server-computer in the form of a privately hosted video call to facilitate the connection of participants during each speed date.

The platform (10) of the present invention preferably requires both participants and viewers to log in to access the system. Log-in credentials conventionally require a username and password. Participants are required to establish a profile detailing their basic personal information and interests, which help facilitate date matches to other participants. Participants preferably apply for eligibility to participate in the speed-dating event (referenced as "episodes" within a "season," similar to a conventional television show). During the application process, participants are asked to complete a brief survey that includes questions pertaining to the participant. Questions include, but are not limited to, the participant's real name, age, age preference in a mate, religion, ethnicity, location, personal interests/hobbies, and other similar questions. Additionally, participants are requested to record a brief introductory video. In contrast, viewers need only to navigate to the web address of the platform in order to access the platform. Viewers may also optionally provide payment information to enable purchases, if desired. In such instances, an account that is secured with a username/password combination may be required. Additionally, the platform (10) may provide unique links for users to access their accounts, allowing them to view an event without entering their password.

Figure 1:
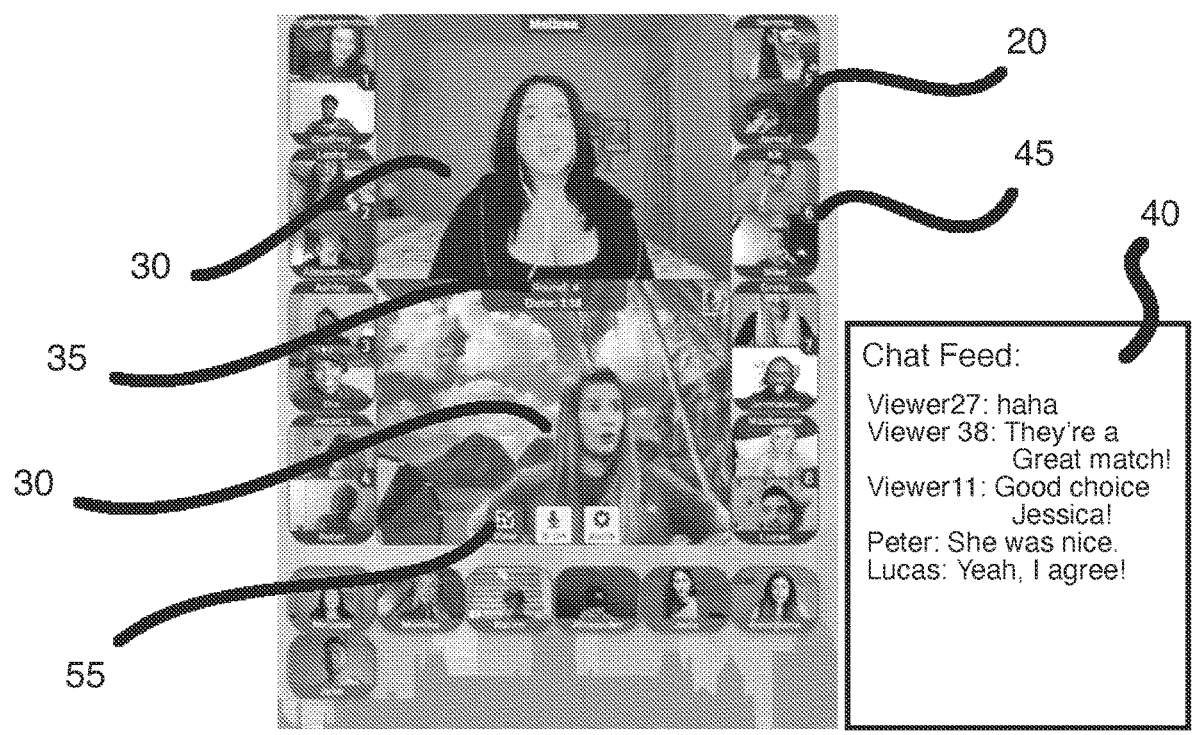
FIG. 1 depicts a view of the platform of the present invention as viewed by an audience member, showing a live video feed of participants on a speed date.

The inherent novelty of the platform (10) and system of the present invention is the capacity for interaction between the participants and the viewers, as well as the capacity for the viewers to alter their perspective of the speed date in real-time. As shown in FIG. 1, when viewers are watching a date between two participants (e.g., Participant A and Participant B), they are shown a live feed (30) from the webcam of either Participant A or Participant B. Both participants are shown, one above the other, as depicted in FIG. 1. Alternately, they may be shown side-to-side in some embodiments of the platform (10). In FIG. 1, the viewer has a first-person view of the date from the perspective of Participant A. At any time, the viewer may opt to click a "change view" button (20), preferably invisible and overlaid onto the video feed itself. When clicked, the button toggles the view to a first-person perspective maintained by Participant B. Viewers can toggle to a first-person view from the perspective of any dater they click. A "countdown timer" (35) is preferably shown at the center of the screen to indicate the current time remaining for the dating round. A "dating room" or "table indicator" (45) is preferably shown on each room thumbnail. A "full-screen" button (55) may also be present on the platform (10) to enlarge the show such that it takes up the viewer's whole screen.

Additionally, a "live chat" feature (40) is present on the side of the live feed (30). This feature enables the viewer to type comments to other viewers and participants. The "live chat" feature (40) is displayed to both daters and viewers in real-time. In addition to typing comments, viewers may "like," "love," "hate," or "gift" to indicate their support (or lack thereof) of the matched participants. Participants are afforded the ability to respond to viewers via chat. They also are provided an opportunity—after the speed-date has completed and during the "post-date confessional period"—to directly address the audience and request feedback, input, or a vote on whether they should pursue the connection further. Additionally, participants may address the camera during the date to briefly respond to comments by the audience, if desired.

Figure 4:
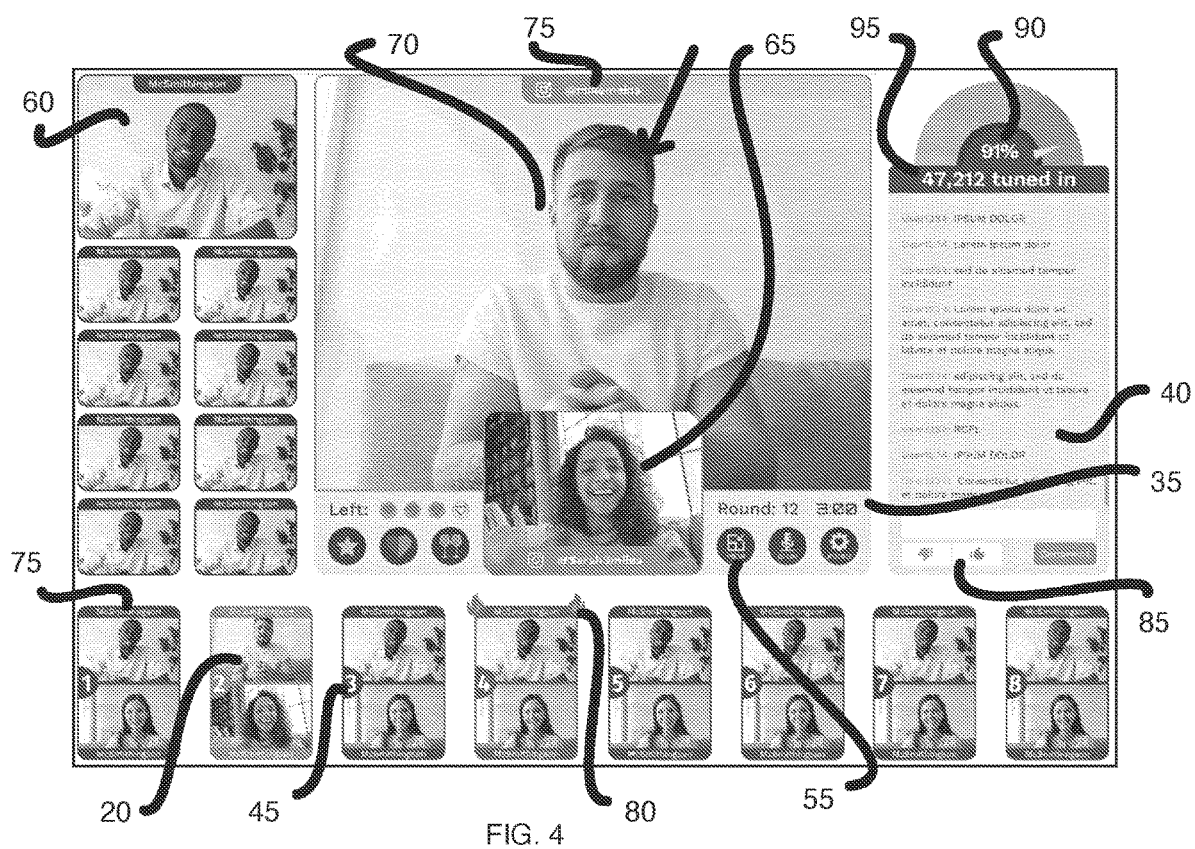
FIG. 4 shows an updated user interface for the platform of the present invention, detailing the streams of the host, the rooms/tables, and the presently occurring date.

As depicted in FIG. 4, some embodiments of the platform (10) of the present invention may exhibit a window depicting the host (60) of the event, seen here in the top left of the platform (10). The viewer may opt to view the host at any time by clicking on their video. If a viewer clicks on a dater (referenced as the selected dater), their video is shown in the medium-sized window in the middle of the screen (65). The datee, with whom the selected dater (65 is speaking, is prominently shown in the large window in the center top of the screen. This view is referenced as the "datee view" (70). It should be noted that each "dating table" or "room" is colored with a tab (75) that matches the color of the selected dater (65). The social media handle for the participant may be depicted in the tab (75) as well. As with the layout depicted in FIG. 1, the "live chat" feature (40 is depicted on the right side of the platform (10). Voting buttons (85), present in the form of a "thumbs up" and a "thumbs down" icon, enable the viewer to provide live input and vote on statements, actions, choices, and other impromptu elements. A "vote counter" (90) is preferably depicted in the top right of the platform (10) to denote the number of positive votes made by viewers. A "viewer counter" (95), which shows the total number of viewers tuned-in to the participant's feed, is in the same location. A "most-viewed indicator" (80) preferably highlights the room that boasts the most viewers at any given time. In this instance, the "most-viewed indicator" (80) is present in the form of flames and a red banner circumscribing the thumbnail of the room as shown in FIG. 4.

Figure 2A:
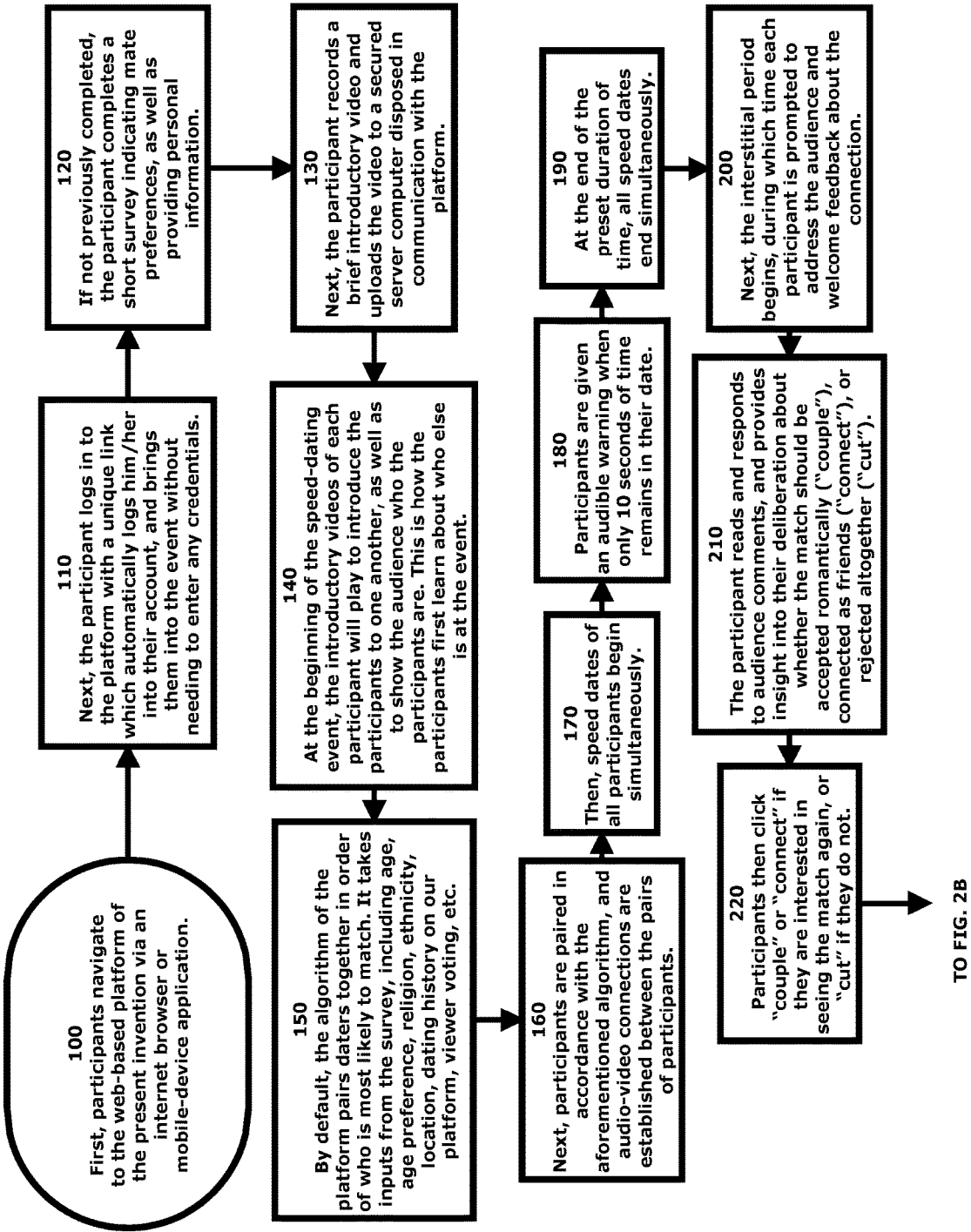
FIG. 2A is a flow chart detailing the process of use of the system of the present invention by a participant.

The process of use of the system and platform of the present invention by participants, as detailed in FIG. 2, is preferably as follows:

1. First, participants navigate to the web-based platform of the present invention via an internet browser or mobile-device application (100).
2. Next, the participant logs in to the platform with a unique link, which automatically logs them into their account and brings them into the event without needing to enter any credentials (110). If needed, a user account is created; however, this may be performed by staff prior to the initiation of the series event.
3. If not previously completed, the participant completes a short survey indicating mate preferences and personal information (120).
4. Next, the participant records a brief introductory video and uploads the video to a secured server-computer disposed in communication with the platform (130).
5. At the beginning of the speed-dating event, the introductory videos of each participant will play to introduce the participants to one another, as well as to show the audience who the participants are. This is how the participants first learn about who else is at the event (140). Initially, the matching algorithm will determine the order that each of the daters get paired together.
6. By default, the algorithm of the platform pairs daters together in the order of who is most likely to match. It takes inputs from the survey, including age, age preference, religion, ethnicity, location, dating history on our platform, viewer voting, etc. (150). Administrators and/or producers maintain the ability to alter the matching algorithm to reverse the order and save the best matches for last in the season, if needed or desired.
7. Next, participants are paired in accordance with the aforementioned algorithm, and audio-video connections are established between the pairs of participants (160).
8. Then, speed dates of all participants begin simultaneously (170). The speed date lasts for a preset duration of time. Presently, the preset duration of time is three minutes; however, it is envisioned that alternate time periods may be employed. A timer is prominently displayed to both the viewers and daters to show the time remaining in the date.
9. Participants are given an audible warning when only 10 seconds of time remains in their date (180).
10. At the end of the preset duration of time, all speed dates end simultaneously (190).
11. Next, the interstitial period begins, during which time each participant is prompted to address the audience and welcome feedback about the connection (200).
12. The participant reads and responds to audience comments, and provides insight into their deliberation about whether the match should be accepted romantically ("couple"), connected as friends ("connect"), or rejected altogether ("cut") (210). Viewers may be presented with a dual-camera view during this period, showing both participants side-by-side during their deliberation.
13. Participants then click "couple" or "connect" if they are interested in seeing the match again, or "cut" if they do not (220). The platform (10) may display the mouse movements of the dater as they deliberate between their selection options.

14. Shortly thereafter, the next round of speed dates begins and the participant is matched with a brand-new dating partner (230).

15. The process is repeated for a predetermined amount of time (240).

16. In subsequent episodes, the participants are rematched (i.e., they date again) if they both selected "couple" upon meeting the first time; if one or both participants selected "cut," they may not meet again (250). The platform reserves the right to rematch them anyway, regardless of their previous couple-connect-cut choices.

17. After the dates are done, all participants join the "after-party," where the host will close out the show (260). The host preferably asks the participants probing questions to get them talking about their experiences on their dates, as well as discloses some of the mutual matches that were made during the show.

18. In most episodes, the host will reveal which participants have been eliminated during the "after-party" (270). Preferably, elimination will be determined by multiple factors, including viewer votes, fewest mutual matches, and producer decisions. Presently, six participants are eliminated per show event.

19. Next, the host will reveal which daters have been awarded a "love life" (280). The "love life" is a trophy of sorts that provides future immunity. It can be used by a participant to save themselves from being voted off/eliminated from the show. If one participant is in possession of a "love life," they may gift it to another participant.

20. The above process is repeated for each episodic event (285).

21. The series ends in episode eight when only half of the original number of participants remain (presently 24 of the original 48 daters); the pair of daters who have maintained the best connection stats and have the most viewer votes will win the competition (290).

22. Prizes are awarded to the winners (295). Prizes may include, but are not limited to, a shared vacation, a cash prize, and/or sponsored products. It is envisioned that the couple that makes it through the aforementioned process the longest may be awarded a prize such as a vacation. Similarly, participants who successfully "coupled" with the most dates may also be awarded a prize.

Episodes exhibited on the platform (10) of the present invention are preferably executed as follows:

- The series begins with 48 participants. The first 24 participants are introduced and paired together in episode one. The second 24 participants are introduced and paired together in episode two. There are no eliminations in the first two episodes.
- Six participants are eliminated in each of episodes three, four, five, and six.
- At the start of episode seven, only 24 of the original 48 participants remain; by its close, six more participants are eliminated. Viewers and/or producers will then select six previously eliminated participants to return for the final episode of the season.
- In the final episode (episode eight), 24 participants will date. The pair of daters who mutually couple and have the most viewer votes will win the competition and be awarded prizes.

Figure 3:
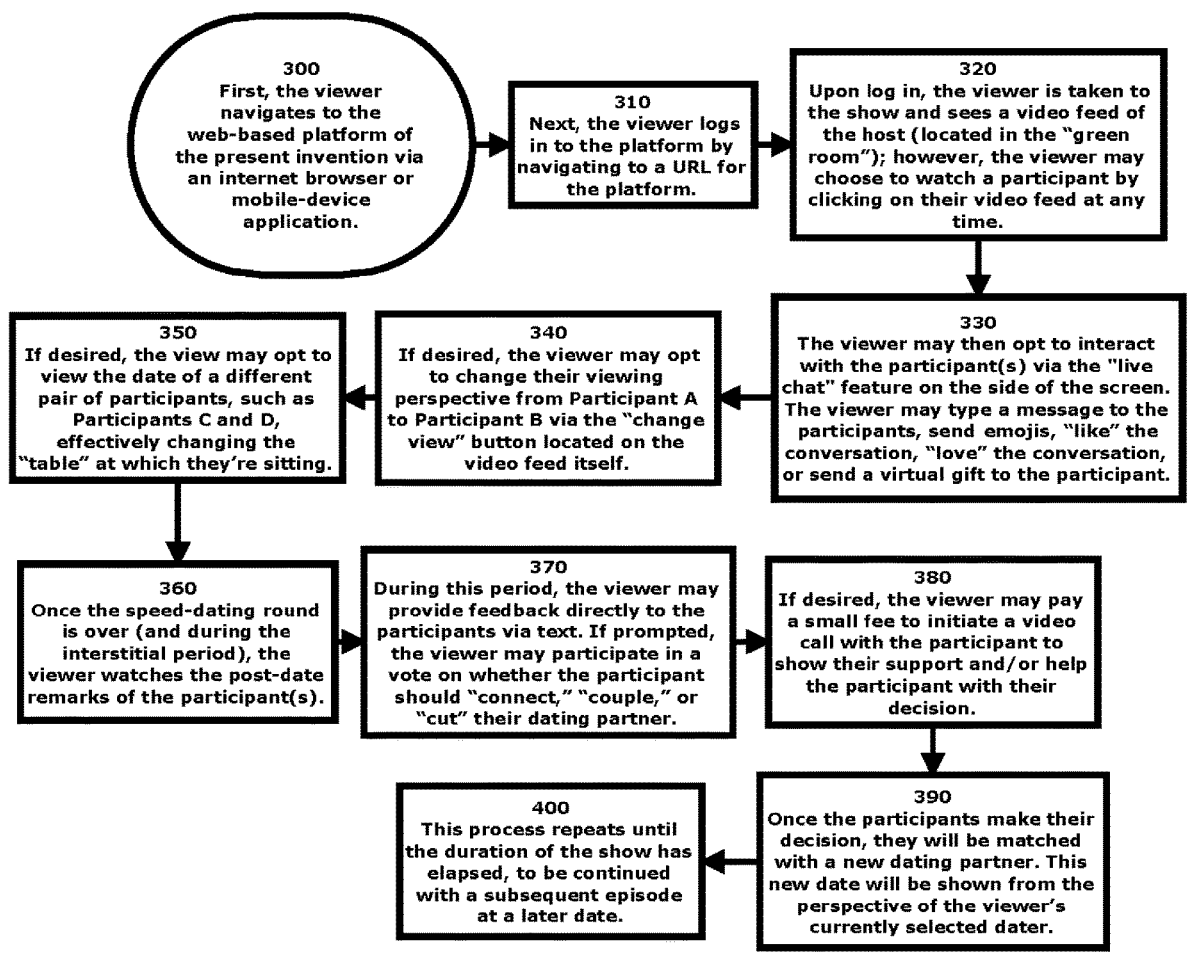
FIG. 3 exhibits a flow chart detailing the process of use of the platform of the present invention by the audience (viewers).

The experience provided for viewers (the audience) on the platform of the present invention differs from that of the participants. The process of use of the system of the present invention by a viewer, as depicted in FIG. 3, is preferably as follows:

1. First, the viewer navigates to the web-based platform of the present invention via an internet browser or mobile-device application (300).

2. Next, the viewer logs in to the platform by navigating to a URL for the platform (310). The user may also log in with their credentials as needed for certain enhanced features. If needed, a user account is created. Optionally, the viewer may create a bracket of who they think will be matched together as couples over the course of the season. This helps viewers get more invested in who is matched and stays together. At the end of the season, the platform may award a virtual prize to viewers who craft a "perfect" bracket.

3. Upon log in, the viewer is taken to the show and sees a video feed of the host (located in the "green room"); however, the viewer may choose to watch a participant by clicking on their video feed at any time (320). The viewer is shown the introductory video as recorded by the participant they're watching.

4. The viewer may then opt to interact with the participant via the "live chat" feature on the side of the screen. The viewer may type a message to the participant, send emojis, "like" the conversation, "love" the conversation, or send a virtual gift to the participant (330).

5. If desired, the viewer may opt to change their viewing perspective from Participant A to Participant B via the "change view" button located on the video feed itself (340).

6. If desired, the view may opt to view the date of a different pair of participants, such as Participants C and D, effectively changing the "table" at which they're sitting (350).

7. Once the speed-dating round is over (and during the interstitial period), the viewer watches the post-date remarks of the participant(s) (360).

8. During this period, the viewer may provide feedback directly to the participants via text. If prompted, the viewer may participate in a vote on whether the participant should "connect," "couple," or "cut" their dating partner (370).

9. If desired, the viewer may pay a small fee to initiate a video call with the participant to show their support and/or help the participant with their decision (380).

10. Once the participants make their decision, they will be matched with a new dating partner. (For example, Participant A will now be matched with Participant C; Participant B with Participant D.) This new date will be shown from the perspective of the viewer's previously selected dater (390).

11. This process repeats until the duration of the show has elapsed, to be continued with a subsequent episode at a later date (400).

Presently, the platform (10) is geared to execute eight simultaneous speed dates between 24 participants. As such, 16 participants will date while the remaining eight stay in the "green room" with the host. Participants will rotate in and out of the "green room" as the event progresses. However, it is envisioned that the number of participants may fluctuate during any given episode session depending on participants' availability. Additionally, each participant preferably is allotted three to four minutes with every other participant of their desired gender.

It should be understood that conventional back-end processing is preferably employed in the creation and hosting of the platform (10) of the present invention. Due to inherent obstacles in multi-platform streaming, the system of the present invention has standardized the video input of all participants to a static resolution to ensure a consistent viewing experience for viewers. As such, regardless of the computer, tablet, and/or webcam the participant uses, the output is preferably made consistent so that switching views between participants is seamless. It should be understood that the platform provides ultra-low latency video streaming to ensure that all viewers are watching the same event simultaneously without lag. This is critical to keeping the "live chat" feed relevant to the events of the date in real time.

Further, the back-end of the system and platform of the present invention preferably employs cloud-based "phantom agents" (550) that are running on virtual machines (540). To elaborate, for every "real" participant (dater) who attends the event, a "phantom" participant logs in to the event as well. The phantom participant (550) is a system agent that runs on a virtual machine (540) in the cloud; it is invisible to both viewers (590) and participants (520). There is one virtual machine (540) and one phantom participant (550) for every real participant (520) in the event. Each virtual machine (540) is configured to run an internet browser (560), preferably Google™ Chrome™ (or a similar browser based off of Chromium™). On the browser, two tabs are opened automatically upon connection. On a first browser tab (570), the phantom-agent participant automatically logs in to the event on the platform. On a second browser tab (580), streaming software (preferably provided via a third-party platform) runs to automatically capture the video stream from the first browser tab. This video stream is then conveyed to viewers in the audience. The User Interface (UI) generated by the browser for the phantom agent mirrors that of the real-life participant counterpart that the phantom agent is mimicking. Some differences intentionally exist between the two, as some UI elements are meant for the participants to see—such as system controls—and do not need to be seen by viewers (590) in the audience (and vice versa). This phantom-agent arrangement enables the platform (10) and system of the present invention to provide a high-quality and consistent experience for the viewers (590), despite differences in each participant's screen resolution, video camera resolution, and computing capabilities. Additionally, this arrangement facilitates the collection and broadcast of each participant's video and audio streams without actually running streaming software locally on their computers. It is known that many forms of streaming software can be processing-intensive, and some lower-cost processors lack the capacity to run such software in addition to a robust browser or other applications.

It should be noted that in the preferred embodiment of the present invention, mouse movements of the participants are preferably captured and relayed to viewers to provide insight into the deliberation of the participants in selecting "connect," "cut," or "couple" after each speed date. This is accomplished by the participants' client devices (participant computers (530) sending mouse coordinates, in real-time, to remote cloud servers in sub-second intervals. These mouse coordinates are then relayed to the virtual machines (540) running the phantom agents (550), and a proxy mouse cursor is then overlaid on top of the other screen elements during the couple/connect/cut decision point. In some embodiments of the present invention, each participant may only be allowed to "couple" with a set number of participants (520), ensuring eventual elimination of some participants at the conclusion of each episode.

Other Platform Features

When each of the Daters are in the Couple Decision stage, at which time they decide if they wish to "couple" or "cut" the person they just dated, the mouse events are being monitored from the client and sent to the backend servers (500) associated with the platform of the present invention. These mouse events are being forwarded to the Emulated Users and captured in the Dater Stream, so the Viewers (590) can see where their mouse cursors are when they are making their decisions. In addition, the Selection events when the Dater presses a button to indicate a "couple" or "cut" are tracked and emitted back to the Viewer (590) on a separate data connection, facilitated by a socket connection to the backend servers. The Decision events are forwarded to the Viewers (590) when they are also logged in the backend, allowing them to see what the Dater's decisions are close to when they made their decision (in near real time).

Viewers Pinned to a Dater as a Selected Continuous Stream

Viewers (590) are generally most interested in certain cast members (daters) over others. For the best experience for viewers, the platform is set to pin the viewer's view stream to a specific dater so that they follow that dater through the entire event until they decide to switch to a new dater. Each Dater (participant (520) is assigned a Streaming Channel which captures the Emulated View for that Dater. When Viewers (590) click on a Dater's Table Video, the streaming channel is switched to display that Dater's Emulated View. The Emulated View displays what the state is of the Dater's View for the Dater it is emulating. As such, the recorded stream will track whatever the Emulated View is for that Dater until the Viewer decides to switch the Streaming Channel, closes the browser window, or navigates to a different webpage using the browser window.

Later Viewing (Non-Live Playback)

Viewers (590) who watch CoupleTV live on the platform (10) of the present invention can only be tuned into one date at a time. This means that they miss most of what happens during an event. The platform (10) provides a way to watch a recording of the event that mimics the viewing experience during the event so that viewers can binge-watch recorded episodes and catch up on what they missed.

To create a video player which emulated the experience, a viewer (590) would have in the CoupleTV Viewing live event, a background video player with an overlay of buttons to select the Daters as they do in the Couple TV Viewer application needed to be created. A programmatic, client side video player (in this case using the JavaScript module VideoJS™ by Brightcove, Inc© [https://videojs.com/]) was needed to detect the time in the video that the player had and to be able to trigger state changes in the buttons based on what the state of the CoupleTV event was in the video (pre-dating, dating, feedback, elimination, etc.). Recordings of the streamed video of the Emulated User were captured and are used as the media for the CoupleTV video player.

Each video is edited to be synchronized within one second of recording from each other so that relative time indexes can be applied. From the server, each numbered Round of the Couple TV event (pre-dating being 0, dating being 1 to N-many rounds, and feedback being N+1 many rounds; in events with eliminations, feedback will toggle between N+M+1 many rounds, with M being the number of elimination rounds which exist at the time index in question for that event). The Recorded Videos are stored in a file datastore on a server (in this case Amazon™ S3™). During the events, to track which Daters get paired with other Daters (i.e. participants (520) to participants (520), the state of the users on each Dating Table is recorded in the database disposed in communication with the server computer (500). This information is used to map the Video Recording source links on the external datastore to the buttons on the CoupleTV Video player using the Dater's Primary Key Identifier (PKID) in this table. A relational table maps the Video Recording source link for the Dater in this Event to the PKID on our database. This information is loaded into the client browser at load time for the Event that the Video Player user decides to view.

When the user (viewer (590) plays the video, every video time index change checks to see if the user is still in the same Event Round based on the current time index. If so, nothing happens and the video continues playing with the existing settings. If it detects it is in a different Event Round based on the time index, it will update the Dater Table Buttons overlaid on the playing video for that Event Round. If a Video Player User clicks on the Dater Table Button for the corresponding Dater it is over, it will change the video source in the client side video player and once loaded move the time index of the video player to where it previously was before the button was clicked. Since all the video time indexes are synced, it will show what was going on in that Dater's Emulated View at that time relative to the time index of the Event Time. If a Video Player user decides to return to the Event Lobby, they need only click on any of the Dater Videos in the Lobby area of the video and it will switch to the Host's Video Feed. Since the Host is always in the Lobby in every CoupleTV Event, the effective view for every Dater in the Lobby Room will be the same as the Host.

At any time, the Video Player user can change the time index dynamically using the video index tool on the bottom of the client-side video player. Using the logic stated above, whatever Event Video the user is currently on will be indexed. This allows Video Player users who are only interested in a single or limited number of participants to follow only this feed throughout the event. The Dater Table Buttons are only enabled during the Dating Rounds of the event, since the Video Recordings will logically be the same when all the users are in the PreDating, Feedback, or Elimination stages. To re-enable the buttons if a user wants to switch a Video in a non-dating stage, they need only move the time index tool to a time when a Dating round is occurring and select the corresponding Dater Table button for the dater they desire (if available).

One of the problems with conventional and/or small-scale live or cast media streams is that there is the potential for packet loss in transmission as well as delayed packet transmission based on the type of packet transmission protocol being used (User Datagram Protocol [a lossy transmission format] or Transmission Control Protocol [an error correcting, but slower data transmission format]). Due to this, finer details in the original streamed media can be downgraded due to a variety of factors (media decompression on the client side, estimated packet rendering, etc).

A particular detail which was experiencing loss in initially streamed media was the fidelity of text on the screen, such as captured chat messages, Dater names, event transmission text, and more. In an attempt to resolve this, the text which would be displayed on the Emulated User view is forwarded via a messaging event using a publish/subscribe messaging model (in this case using Pusher™ Channels™ [https://pusher.com/]) from the backend server when the given event is occurring. The text on the CoupleTV Event Viewer screen is rendered natively on the client in an overlay on the streamed media using the messages returned from the server push rather than as a part of the streamed media feed itself. Since it is being rendered natively on demand, the text has the highest fidelity that the client browser can provide to the user, allowing for finer details such as text kerning and crisp edging on the letters to be provided.

Novelty of Back-End Code of Platform (10)

An integral part of the system and platform (10) of the present invention is to be able to stream an entertainment view out to the viewers (590) which can have different display elements than the participants (520) or Host would see within the event. As such, a user which mimics the connection of another actual user would need to be established, referred to internally as a Phantom User (540). The Phantom User (540) is a participant in the event, but only acts as a listening agent. No local media is streamed out from the Phantom User client, but it displays media as it would be shown for the User it is emulating, referred to as the Emulated User. A pool of available Phantom Users is established in the system to facilitate the connection procedures with the WebRTC server in connecting to the Group Room. A Phantom participant (550) (also referenced as a phantom agent or phantom user) becomes logically bound to an Emulated User who is already in the Group Room on the backend upon entry. The normal data load procedure for identifying the local User to the Client is requested using the Emulated User identifying information, which allows the Phantom User (550) to mimic the appearance of the Emulated User while still having a unique connection identifier with the WebRTC server.

The Phantom User view is streamed out using a separate WebRTC Capture tool which is established in a separate thread from the Application Client session. This capture tool uses the tabCapture API, which is designed to forward the render data for a specific window tab in a browser. Definitions for how this API works can be found in both Chromium™ documentation http://developer.chrome.com.docs.extensions/reference/tabCapture/) and Mozilla™ documentation (https://developer.mozilla.org/en-US/docs/Mozilla/Add-ons/WebExtentions/API/tabs/capture/Tab).

The tabCature API forwards the rendered visual and audio tracks to the WebRTC Capture tool for it to be sent to a cloud based WebRTC media server with an MCU, allowing it to be both forwarded as a stream output and stored for processing a recorded session of the event at a later time. On the website of the platform, a viewer page is configured with a streaming endpoint to the MCU Server to receive the media payload and allow it to be viewed by however many individuals wish to subscribe to the stream.

A scalable solution was required to implement the Phantom User & Screen Capture methodology employed by the system of the present invention. In order to facilitate this, a virtualized instance containing an operating system with a Graphical User Interface (GUI) and a web browser with a GUI supporting the tabCapture API would be required in order for the application to operate as intended. The interface elements for enabling the tabCapture API are established on a web browser level rather than on a web page level (for security reasons). In order to programmatically establish the sessions, an image recognition application would need to be run on a hosting device to interact with the scaling infrastructure to create the new sessions and configure them.

The software used for the image recognition and interaction implemented in the system and platform of the present invention is called SikukiX by RaiMan (http://sikulix.com/), an open source application using the OpenCV image recognition computer suite (https://opencv.org/). It is used to determine which actions to perform on the displayed operating system GUI presenting the web browser which the Phantom User and JavaScript-based WebRIC Web Capture software will need to be run from. Interactions in the application are driven by a source script, written in the Python programming language (https://www.python.org/), which has all the user interface interactions and any programmatic sequences which need to be performed declared in it.

The cloud interface employed by the backend of the system of the present invention is via Amazon App- Stream2.0™ via the Amazon Web Services™ (AWS™) platform for establishing the virtualized Microsoft Windows™ operating system instances with a Chromium™ browser loaded into them on initialization. The instances are scaled up by a SikuliX instance running a Python script coded to open a web browser and navigate into the AWS™ console and create each of the Phantom User instances needed for the event. Links generated from this process are logged into a storage location for any support that may be needed on an individual instance at a later time. A separate SikuliX instance runs with a Python script and opens each URL with the logged instance. A Uniform Resource Locator (URL) associated with each user participating in the event is loaded into the web browser running on the virtualized instance via the AppStream™ link loaded into a web browser on the device hosting the SikuliX application, referred to as the Phantom User Interface within this document. After the web page renders from the aforementioned URL, a new tab is opened in the virtualized web browser and a URL for the WebRTC web application is entered. SikukiX will then enter in any key information regarding the establishment of the streaming session and begin the streaming session for capture using the tabCapture API in the virtualized web browser, selecting the tab with the Phantom User instance. The hosted web browser will be closed by SikuliX once the configuration has finished and it will continue to the next Emulated User in the event until there are no more.

SikuliX Example Code—OpenAppStream.py (PNG file links are of UI elements and buttons in application):

```
names = ['Host',
'AdielGrech',
'MikeMains',
'RodneySmithII'.
'FemiOrenuga',
'GeorgianaDusa',
'JessZekser',
'LeshaJay'.
'CherylSutherland',
'Emanuele',
'LoveAtiya',
'NicoleRosati',
'Betty',
'JohnZibin',
'TynishaRenee',
'EllaAlexandriaLove',
'AriaMahdavi',
'AlyJay',
'AutumnKealy',
'JakeOndrus',
'Pedrooo',
'Arnie',
'KatrinaRaye',
'Pureness',
'Abisola']
links = ['Host',
'ehui.couple.com/room/index.php?ue=Q2XkN8Zp%2F0pG%2FEYU0%2F%2FgNuzHw4BzKZrBVDOixIDTPWk%3D&ut=cplPbI-19aug2021-qCVjN611e5ee540ba9883091288',
'ehui.couple.com/room/index.php?ue=3MMi%2BGjRpMpn3fIwzvopOhEisuHQFuJibGUuGVmS48s%3D&ut=cplPbI-19aug2021-qCVjN611e5ee540ba9883091288',
'ehui.couple.com/room/index.php?ue=zDU9Ao8xEae6E%2FPN%2Bw7tV%2FWI%2B0eE62kob%2BWisUQ4wE0%3D&ut=cplPbI-19aug2021-qCVjN611e5ee540ba9883091288',
'ehui.couple.com/room/index.php?ue=NKuX4uM8WkDa9yF%2FyijUZwNGYAj%2F4IoJZnOvr%2FoUxk0%3D&ut=cplPbI-19aug2021-qCVjN611e5ee540ba9883091288',
'ehui.couple.com/room/index.php?ue=rigHDwKtiTDpejE06KSqt9BxWoidmJMdMvqz3kQrhDU%3D&ut=cplPbI-19aug2021-qCVjN611e5ee540ba9883091288',
'ehui.couple.com/room/index.php?ue=jkBpxXA2N2LxX2v2938DdU0sH6KymmN7Lw2NFC0Y7rc%3D&ut=cplPbI-19aug2021-qCVjN611e5ee540ba9883091288',
'ehui.couple.com/room/index.php?ue=j9Olhyg49vLreExWvkAOKcAX2lD4QjkANzGA%2FaMFdjo%3D&ut=cplPbI-19aug2021-qCVjN611e5ee540ba9883091288',
'ehui.couple.com/room/index.php?ue=tUQ2v%2BKI2H4XR5I5L4lQY81XdxlPcN%2BxQf45c91z7lM%3D&ut=cplPbI-19aug2021-qCVjN611e5ee540ba9883091288',
'ehui.couple.com/room/index.php?ue=IvWzvR90QbhPSC%2BI9HCoFuqMmTEF%2FwGWFbFw232MCrU%3D&ut=cplPbI-19aug2021-qCVjN611e5ee540ba9883091288',
'ehui.couple.com/room/index.php?ue=7yNoHxvA7QIIis7KyfJ6GyHu3yzGb5CL44tRKAuL8fE%3D&ut=cplPbI-19aug2021-qCVjN611e5ee540ba9883091288',
'ehui.couple.com/room/index.php?ue=VZx6LZJFOurWgdH7K0ak%2FZQf33B1yVS8pAELD%2Bd7P6M%3D&ut=cplPbI-19aug2021-qCVjN611e5ee540ba9883091288',
'ehui.couple.com/room/index.php?ue=uwdsStV%2BGmEuUYNwauThHDxxYry4RL9gr5JUr2puK8A%3D&ut=cplPbI-19aug2021-qCVjN611e5ee540ba9883091288',
'ehui.couple.com/room/index.php?ue=uhYuhZKoIZ9IFMUMbhdfjy75zu1YnImoe2HwQUHnlBc%3D&ut=cplPbI-19aug2021-qCVjN611e5ee540ba9883091288',
'ehui.couple.com/room/index.php?ue=1ZLSwDgRZ7XiQE5eZhtHYBWGuuibPIb3LqIFMJKzpZc%3D&ut=cplPbI-19aug2021-qCVjN611e5eeS40ba9883091288',
'ehui.couple.com/room/index.php?ue=vHMl%2Blom8kAnBjx2OBs9%2FMOyPb5qzlSDIK1QZKtBdNc%3D&ut=cplPbI-19aug2021-qCVjN611e5ee540ba9883091288',
'ehui.couple.com/room/index.php?ue=tsNwVkjcE%2BqBHvrQT93W5ZNsQHPATGyhQu1nhxnxCOE%3D&ut=cplPbI-19aug2O21-qCVjN611e5ee540ba9883091288',
'ehui.couple.com/room/index.php?ue=IDI%2BaaZ9LvhCrtHxw2LD%2BdiK%2BWxLPyfcBvYIbEuk414%3D&ut=cplPbI-19aug2021-qCVjN611e5ee540ba9883091288',
'ehui.couple.com/room/index.php?ue=JjKSSIXmOYmxlOTLKmKlCxyvOsRIsMed1%2F14qZqlTf4%3D&ut=cplPbI-19aug2021-qCVjN611e5ee540ba9883091288',
```

```
'ehui.couple.com/room/index.php?ue=KesQzfydKNa0SVXh4RCFq%2FWVdAzbtBK5Z%2BMPcTw7NKI%3D&ut=cplPbI-19aug2021-
qCVjN611e5ee540ba9883091288',
'ehui.couple.com/room/index.php?ue=0%2BbSgXqqgFDXGLLBCGI0Nzj9JXwYCq2GPp%2BwVZNFH%2F4%3D&ut=cplPbI-19aug2021-
qCVjN611e5ee540ba9883091288',
'ehui.couple.com/room/index.php?ue=iAEMuH%2FnOvHbrJVObwh9KUJeckloyCQ5ZtkK91mPhrE%3D&ut=cplPbI-19aug2021-
qCVjN611e5ee540ba9883091288',
'ehui.couple.com/room/index.php?ue=jAy88aL4fLf7bpj2WBM58GsUpqNSqcQnx79krQpMuPc%3D&ut=cplPbI-19aug2021-
qCVjN611e5ee540ba9883091288',
'ehui.couple.com/room/index.php?ue=3dVi8d5wqW%2BDoxKeZvY8OBylOtitI1vukUb%2FQRUiYUU%3D&ut=cplPbI-19aug2021-
qCVjN611e5ee540ba9883091288',
'ehui.couple.com/room/index.php?ue=66jhnZHBZHVb0VMzf73OMZznzhkbsmWKUrOSFPTNfR0%3D&ut=cplPbI-19aug2021-
qCVjN611e5ee540ba9883091288']
i = 0
for name in names: # This would be the amount of influencers coming
    print(i)
    click("1616600486006.png")
    click("1616600486006.png")
    wait(2)
    click("1616610328853.png")
    wait(2)
    click("1616600566102,png")
    wait(2)
    click("1616600604408.png")
    wait(4)
    click("1618529981338.png")
    click("1616600638605.png")
    click("1616600666439.png")
    wait(1)
    click("1616600684354.png")
    type("stream"+str(names[i]))
    click("1618354507697.png")
    click("1617738612197.png")
    wait(1)
    click("1617738629014.png")
    click("1616600712594.png")
    wait(1)
    click("1617737950075.png")
    click("1616600756328.png")
    wait(3)
    if exists("1616600772731.png"):
        click("1616600772731.png")
    wait(1)
    click("1617738742010.png")
    wait(1)
    click("1617737933013.png")
    wait(5)
    type(str(names[i]) + " ")
    wait(1)
    type("v", KEY_CTRL)
    wait(2)
    type(Key.ENTER)
    type(Key.ENTER)
    wait(2)
    if exists("1617900889488.png"):
        click("1617900889488.png")
        wait(2)
    i += 1
```

Elaboration on Streaming Methodology of the Present Invention

A focused screen capture of the contents of the webpage is performed as a viewing user of the event. For implementation on the platform of the present invention, a web-based capture solution is used, running in a separate browser window/tab from the event to facilitate the capture process. The capture methodology uses the WebRTC standard for establishing a WebSocket connections with a Real Time Communication datastream (referred to as a RTCPeerConnection in the WebRTC standard) with two media endpoints (such as between two video conferencing participants) to stream both audio and video media through an TCP/IP connection. Negotiation of signaling communication is done via the getUserMedia call of the standard, which typically implements SIP over WebSockets (IETF RFC 7118). The WebRTC 1.0 standard is both an IETF and W3C accepted web standard for implementation in current browsers. Application and status information can also be transferred via separate data channel connections as part of the WebRTC standard. Native HTML5 standards are applied to the implementation of the WebRTC standard such that it is accepted on all HTML5 supported web browsers (albeit in customized ways based on the browser provider's discretion). For the purposes of our application and the utilization of simulcast data for participants in the event, connections between video conference members is performed via the VP8 video encoding standard, but transfer of the captured web browser connections for live streaming is done with the VP9 video encoding standard for general quality and performance improvements. Negotiation of the audio codec between video conference participants is done using SIP and whatever preferred codecs are available on their browsers. Video recordings which are used in the video player leverage the OPUS codec as it can be handled by all common browsers. Videos are transcoded using the libvpx Library supported by The WebM Project (https://www.webmproject.org/) and audio transcoding uses the libopus Library supported by the Xiph.org Foundation (https://xiph.org/). These libraries are interfaced by the FFmpeg Application (https://www.ffmpeg.org/) to manage the transcoding process. The raw video stream data is compiled into Matroska Video (MKV) and Matroska. Audio (MKA) files as per the Matroska Media Container standard (https://www.matroska.org/index.html).

The resultant transcoded format for the interlaced video file is in an MPEG-4 Part 14 (MP4) file format, as defined by the ISO/IEC Moving Picture Experts Group of the International Organization for Standardization (ISO) under standard ISO/LEC 14496-15 (https://wwwiso.org/standard/38538.html). Excerpt of LiveSwitch Console WebSocket Connector Class:

(This is the basic WebSocket code for how the Liveswitch JavaScript software establishes data streams with the backend of the platform of the present invention.)

```
var WebSocket = /** @class */ (function (_super) {
    __extends(WebSocket, _super);
    function WebSocket(requestUrl, protocol) {
        var _this = _super.call(this) || this;
        _this.onOpen = function (e) {
            _this.raiseOnResponseReceived( );
            _this._opening = false;
            _this.raiseOpenSuccess(_this._openArgs);
        };
        _this.onError = function (e) {
            if (_this._opening) {
                if (!_this._raisedOpenFailure) {
                    _this._raisedOpenfailure = true;
                    _this.raiseOpenFailure(_this._openArgs, fm.liveswitch.WebSocketStatusCode.Abnormal, new fm.liveswitch.Exception('WebSocket error.'));
                }
            }
            else if (!_this._closing) {
                if (!_this._raisedStreamFailure) {
                    _this._raisedStreamFailure = true;
                    _this.raiseStreamFailure(_this._openArgs, fm.liveswitch.WebSocketStatusCode.Abnormal, new fm.liveswitch.Exception('WebSocket error.'));
                }
            }
        };
        _this.onClose = function (e) {
            _this.processOnClose(e.code, e.reason);
        };
        _this.onMessage = function (e) {
            if (_this._timer) {
                window.clearTimeout(_this._timer);
            }
            //this.raiseOnResponseReceived( );
            _this._sendArgs = null;
            var binaryMessage = null;
            var textMessage = null;
            if (!WebSocket.getDisableBinary( ) && e.data instanceof ArrayBuffer) {
                binaryMessage = new Uint8Array(e.data);
            }
            else {
                textMessage = e.data;
            }
            return _this.raiseReceive(_this._openArgs, textMessage, binaryMessage);
        };
        requestUrl = fm.liveswitch.Util.absolutizeUrl(requestUrl);
        requestUrl = requestUrl.replace('https://', 'wss://');
        requestUrl = requestUrl.replace('http://', 'ws://');
        _this._requestUrl = requestUrl;
        _this._protocol = protocol || null;
        _this._webSocket = null;
        _this._onRequestCreated = null;
        _this._onResponseReceived = null;
        _this._opening = false;
        _this._closing = false;
        _this._aborting = false;
        _this._openArgs = null;
        _this._sendArgs = null;
        _this._timer = 0;
        _this._raisedStreamFailure = false;
        _this._raisedOpenFailure = false;
        return _this;
    }
    WebSocket.prototype.getTypeString = function ( ) {
        return '[fm.liveswitch.WebSocket]' + ',' + _super.prototype.getTypeString.call(this);
    };
    WebSocket.getExists = function ( ) {
        return true;
    };
```

```
WebSocket.setDisableBinary = function (disableBinary) {
   WebSocket._disableBinary = disableBinary;
};
WebSocket.getDisableBinary = function ( ) {
   if (typeof Uint8Array === 'undefined') {
      return true;
   }
   return WebSocket._disableBinary;
};
WebSocket.prototype.getSecure = function ( ) {
   return (this._requestUrl.indexOf('wss://') === 0);
};
WebSocket.prototype.getBufferedAmount = function ( ) {
   if (!this._webSocket) {
      return 0;
   }
   return this._webSocket.bufferedAmount;
};
WebSocket.prototype.getIsOpen = function ( ) {
   if (!this._webSocket) {
      return false;
   }
   return (this._webSocket.readyState === 1);
};
WebSocket.prototype.open = function (args) {
   var url = this._requestUrl;
   this._openArgs = args;
   this._onRequestCreated = args.getOnRequestCreated( );
   this._onResponseReceived = args.getOnResponseReceived( );
   this.raiseOnRequestCreated( );
   var headers = args.getHeaders( );
   var headersHash = { };
   if (headers) {
      headersHash = headers.toHash( );
   }
   if (WebSocket.getDisableBinary( )) {
      headersHash['X-FM-DisableBinary'] = 'true';
   }
   url = fm.liveswitch.HttpTransfer.addQueryToUrl(url, 'headers', fm.liveswitch.Json.serialize(headersHash));
   if ('WebSocket' in window) {
      this._webSocket = (this._protocol ? new window.WebSocket(url, this._protocol) : new window.WebSocket(url));
   }
   if (!this._webSocket) {
      this.raiseOpenFailure(args, fm.liveswitch.WebSocketStatusCode.NoStatus, new fm.liveswitch.Exception('Could not create WebSocket.'));
      return;
   }
   if (!WebSocket.getDisableBinary( )) {
      try {
         this._webSocket.binaryType = 'arraybuffer';
      }
      catch (error) {
         WebSocket.setDisableBinary(true);
      }
   }
   this._opening = true;
   this._closing = false;
   this._raisedStreamFailure = false;
   this._raisedOpenFailure = false;
   this._webSocket.onopen = this.onOpen;
   this._webSocket.onerror = this.onError;
   this._webSocket.onclose = this.onClose;
   this._webSocket.onmessage = this.onMessage;
};
WebSocket.prototype.processOnClose = function (code, reason) {
   var reasonText = '';
   if (!fm.liveswitch.StringExtensions.isNullOrEmpty(reason)) {
      reasonText = ' (' + reason + ')';
   }
   if (this._opening) {
      if (!this._raisedOpenFailure) {
         this._raisedOpenFailure = true;
         this.raiseOpenFailure(this._openArgs, code, new fm.liveswitch.Exception('Could not open WebSocket.' + reasonText));
      }
   }
   else if (this._aborting) {
      if (!this._raisedStreamFailure) {
         this._raisedStreamFailure = true;
         this.raiseStreamFailure(this._openArgs, code, new fm.liveswitch.Exception('WebSocket request timed out.' + reasonText));
```

```
      }
   }
   else if (!this._closing) {
      if (!this._raisedStreamFailure) {
         this._raisedStreamFailure = true;
         this.raiseStreamFailure(this._openArgs, code, new fm.liveswitch.Exception('WebSocket closed.' + reasonText));
      }
   }
};
WebSocket.prototype.send = function (args) {
   var _this = this;
   if (!this._webSocket) {
      return;
   }
   this._sendArgs = args;
   //this.raiseOnRequestCreated( );
   if (this._timer) {
      window.clearTimeout(this._timer);
   }
   var timeout = args.getTimeout( );
   if (timeout > 0) {
      this._timer = window.setTimeout(function ( ) {
         if (!_this._webSocket) {
            return;
         }
         _this._aborting = true;
         _this._webSocket.close( );
         _this.processOnClose(4000, 'Timeout');
      }, timeout);
   }
   var sentBinary = false;
   var binary = args.getBinaryMessage( );
   if (!WebSocket.getDisableBinary( ) && binary) {
      try {
         this._webSocket.send(binary.buffer);
         sentBinary = true;
      }
      catch (error) {
         WebSocket.setDisableBinary(true);
      }
   }
   if (!sentBinary) {
      return this._webSocket.send(args.getTextMessage( ));
   }
};
WebSocket.prototype.close = function (args) {
   if (typeof args === 'undefined') {
      this.close(new fm.liveswitch.WebSocketCloseArgs( ));
      return;
   }
   var code = args.getStatusCode( ) || fm.liveswitch.WebSocketStatusCode.Normal;
   var reason = args.getReason( ) || '';
   var e = new fm.liveswitch.WebSocketCloseCompleteArgs( );
   e.setStatusCode(code);
   e.setReason(reason);
   window.clearTimeout(this._timer);
   if (this._webSocket) {
      this._closing = true;
      this._webSocket.close(code, reason);
      this._webSocket = null;
   }
   this.raiseCloseComplete(args, code, reason);
};
WebSocket.prototype.raiseOnRequestCreated = function ( ) {
   if (this._onRequestCreated) {
      var args = new fm.liveswitch.HttpRequestCreatedArgs( );
      args.setSender(this._openArgs.getSender( ));
      args.setRequest(null);
      this._onRequestCreated(args);
   }
```

```
    };
    WebSocket.prototype.raiseOnResponseReceived = function ( ) {
      if (this._onResponseReceived) {
        var args = new fm.liveswitch.HttpResponseReceivedArgs( );
        args.setSender(this._openArgs.getSender( ));
        args.setResponse(null);
        this._onResponseReceived(args);
      }
    };
    WebSocket._disableBinary = false;
    return WebSocket;
}(fm.liveswitch.WebSocketBase));
liveswitch.WebSocket = WebSocket;
```

Description of Feature Enabling Audience Members to Join the Show with Video and Audio.

The ultimate form of user interactivity on the platform of the present invention is enabling audience members to join the show with video and audio to be seen and heard by all cast members and viewers. This feature is preferably leveraged during the final stage of the show where the "Fan Faves" are selected and subsequently the eliminations are decided and revealed.

Process and Experience

1. During the dating portion of the show, a button appears in the UI for viewers to request to be selected to join via audio and video later during the final stage of the show.
2. When users tap the button, their request is stored in a database table and is viewable for producers and/or administrators of the show on the Producer Panel webpage.
3. Producers and/or administrators of the show can review who has requested to join the show and make a selection based on various criteria such as how many referrals that user has, their chat activity, or their voting history
4. The producer selects an audience member by tapping a select button next to their name in the Producer Panel.
5. When the select button is clicked, a message is sent to that audience member's client computer via Pusher™ which triggers the client browser to bring the user through an audio/video set-up wizard.
6. The selected audience member will walk through the steps in the wizard which allows them to select audio and video device using dropdown menus and confirm that the devices are working.
7. Upon completion of the audio/video set-up wizard, the audio and video device settings will be stored locally on the selected audience member's client device using a cookies.
8. When it's time for the audience member to join with audio and video, the producer taps the join event button next to that audience member's name in the producer panel which will send a message to the audience member's client computer (viewer computer) triggering the audience member to join the event.
9. Upon receiving the "join event" message via Pusher, the audience member's browser will be redirected to a new unique URL which will bring him/her into the event in the same way cast members join the event. In effect, the audience member becomes a temporary participant.
10. The audience member's audio and video feeds will be picked up by the phantom agent(s) running on App Streams enabling all viewers to see and hear the audience member who joined the event.
11. The host of the event will prompt the audience member to participate and select one of the "Fan Faye's" for that episode.
12. When it's time for the audience member to be removed from sharing audio and video, a show producer will tap a "leave show" button in the producer panel which will trigger a Pusher message to be sent to the audience member's client computer.
13. When the "leave show" message is received by the client browser, the browser is redirected to the original viewing URL allowing the audience member to watch the remainder of the show as a standard audience viewer.

Further, it should be noted that the system of the present invention may incorporate a mobile-device application, available on major application distribution channels such as the Apple™ AppStore™, Google™ PlayStore™, and other similar application stores. The mobile-device application is preferably capable of providing the platform (10) of the present invention as formatted for smaller screens, and may be configured to employ onboarded payment mechanisms for microtransactions such as ApplePay™.

Additionally, it should be noted that the platform (10) of the present invention is preferably configured to employ remote storage to ensure the security of participants, including their personal and private data.

Figure 5:
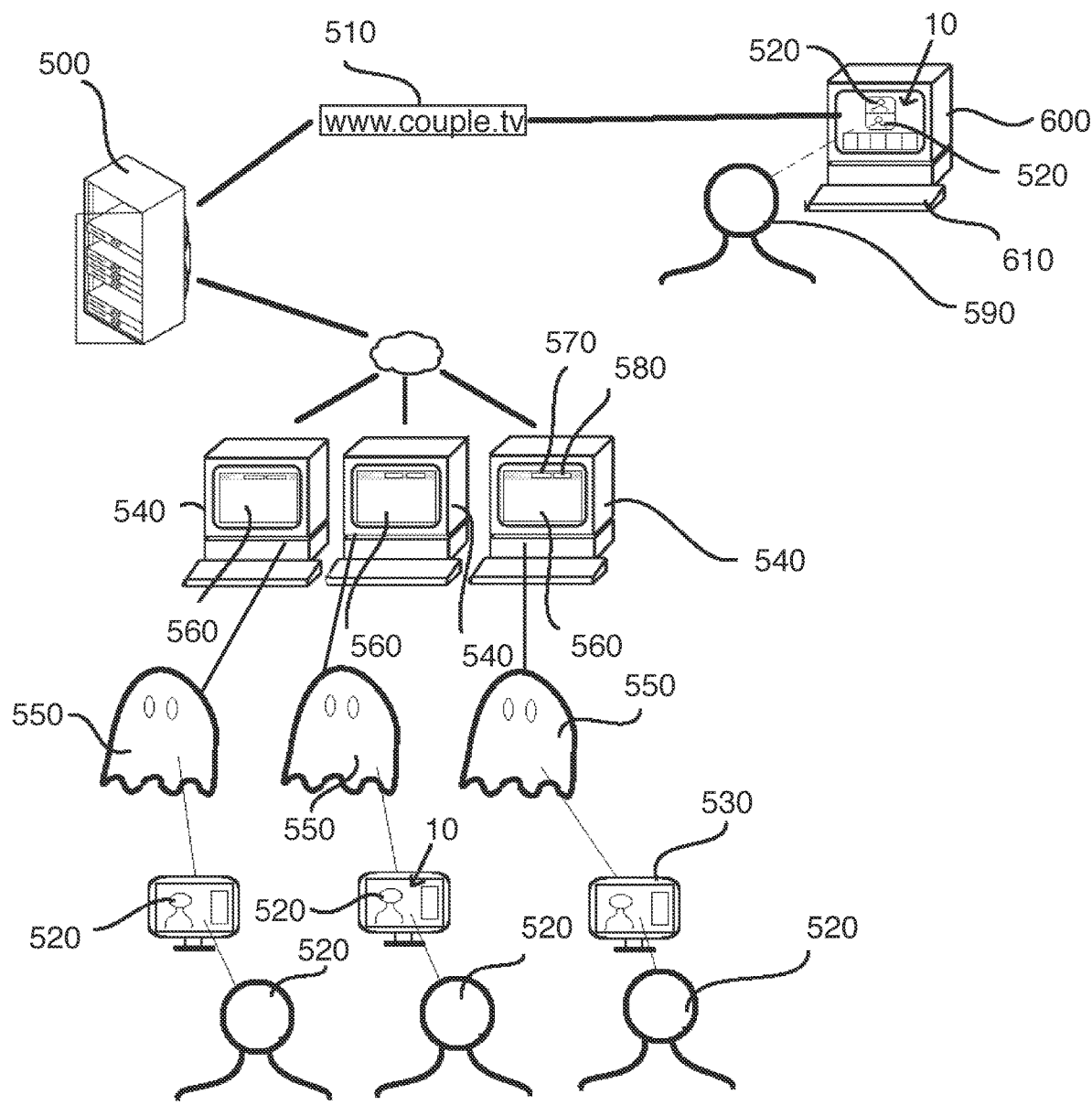
FIG. 5 is a chart detailing the general components of the system and platform of the present invention, including backend equipment facilitating the use thereof.

As previously mentioned, and as detailed in FIG. 5, it should be understood that the system and platform (10) of the present invention employs at least one server computer (500) hosting the platform (10) to a domain (510) (preferably www.couple.tv, although a different domain could be used). Participants (520) access the platform (10) via the internet on participant computers (530) or similar internet connected devices equipped with a camera and a microphone. The at least one server computer (500) connects the participant computers (530) to cloud-based virtual machines (540). The at least one server computer (500) creates phantom participants (550) as system agents running on the virtual machines (540), with a single phantom participant (550) (also referenced as a system agent) associated with each participant computer (530). The virtual machines (540 are instructed to open an internet browser (560). The virtual machines (540) then log into the platform (10) on behalf of the phantom participants (550) via the internet browser (560) in a first browser tab (570). Then, the virtual machines (540) initiate streaming software via the internet browser (560) in a second browser tab (580). The streaming software executed is configured to capture and stream content from the first browser tab (570) to the platform (10). The virtual machines (540) receive audio and video from the participant computers (530) as originated by the participants (520), and the streaming software running in the second browser tabs (580) of the corresponding virtual machines (540) conveys the audio and video of the participants (520) to viewers (590) via the platform (10). Participants (520) are matched together in pairs during one-on-one audio/visual speed-dates for a limited time simultaneously. The platform (10) depicts live streams of all participants (520) to all viewers (590) via viewer computers (600) simultaneously. Viewers (590) may employ input devices (610) such as a keyboard and mouse, to chat between one another. The chat is show in real-time on both the viewer computers (600) and the participant computers (530), facilitating live correspondence between viewers (590) and participants (520).

Further, it should be noted that the platform (10) and system of the present invention facilitates re-watching of past events which have taken place by viewers (590). The replay of events maintains the ability to switch between rooms and participants' perspectives as though it was a live show. This allows viewers to take in the experience in a way that's similar to watching live. It gives people who already watched the event the ability to go back and enjoy the content that they didn't see the first time through. All tracks are in sync and locked in time, and chat may be shown as though it was live as well, though the user cannot add to the archived chat.

If a viewer (590) is being disruptive in chat, administrators of the platform (10) flag the disruptive viewer. Users who are flagged can still chat and see chat messages from everyone else including other flagged users. The key is that regular viewers and participants cannot see chat messages sent by flagged users. This means that chat messages seen by regular users add to the viewing experience. Flagged users remain under the impression that they are being disruptive, but in actuality, it is a wasted effort for them. Because they don't realize they've been flagged, they don't bother coming up with another way to be disruptive to the event, such as creating a new viewer account, or using a different device.

Having illustrated the present invention, it should be understood that various adjustments and versions might be implemented without venturing away from the essence of the present invention. Further, it should be understood that the present invention is not solely limited to the invention as described in the embodiments above, but further comprises any and all embodiments within the scope of this application.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The exemplary embodiment was chosen and described in order to best explain the principles of the present invention and its practical application, and to thereby enable others skilled in the art to utilize both the present invention and its various embodiments with modifications as are suited to the particular use contemplated.

We claim:

1. A method for hosting and exhibiting an interactive speed-dating show online, featuring participants, displayed to viewers watching on viewer computers comprising:
    a server computer hosting a platform online;
    participants accessing the platform via the internet on a computer equipped with a camera and a microphone, referenced as participant computers;
    the server computer connecting the participant computers to cloud-based virtual machines;
    the server computer creating phantom participants as system agents running on the virtual machines, with a single system agent associated with each individual participant computer;
    the virtual machines opening a browser;
    the virtual machines logging into the platform on behalf of the phantom participants via the browser in a first browser tab;
    the virtual machines initiating streaming software via the browser in a second browser tab;
    wherein the streaming software is configured to capture and stream content from the first browser tab to the platform;
    the virtual machines receiving audio and video from the participants computers;
    the streaming software conveying the audio and video to viewers via the platform;
    wherein participants are matched together in pairs during one-on-one audio/visual speed-dates simultaneously; and
    the platform displaying live streams of all participants to all viewers via viewer computers simultaneously.

2. The method of claim 1, wherein multiple browser tabs are employed on the virtual machines.

3. The method of claim 1, wherein the audio and video exhibit sub-second latency.

4. The method of claim 1, wherein the virtual machines are running on a server computer connected to the internet.

5. The method of claim 4, further comprising: the server computer matching participants together in pairs for speed-dates according to an algorithm; the algorithm dictating the order in which participants are paired together; and wherein parameters of the algorithm dictate the pairing of participants, the parameters including: gender, age, religion, ethnicity, location, and viewer input via viewer voting.

6. The method of claim 5, wherein the number of viewers exceeds 10,001.

7. The method of claim 4, further comprising:
    a timer running on the server computer;
    the timer showing the remaining time of the speed-dates;
    the server computer terminating all speed dates upon expiration of the timer;
    the platform displaying to the participants a selection screen, selections available on the selection screen are chosen from the group: "couple," "cut," and "connect;"
    wherein upon selection of "couple" by a participant on the selection screen, the participant is informing the server and the viewers that the participant wishes to romantically connect with the paired participant;
    wherein upon selection of "cut" by a participant on the selection screen, the participant is informing the server and the viewers that the participant does not wish to pursue the connection with the paired participant romantically; and
    wherein upon selection of "connect" by a participant on the selection screen, the participant is informing the server and the viewers that the participant wishes to pursue the connection as friends.

8. A system for hosting and exhibiting an interactive speed-dating show online, featuring participants, displayed to viewers watching on viewer computers comprising:
    a server computer hosting a platform online;
    participants accessing the platform via the internet on a computer equipped with a camera and a microphone, referenced as participant computers;
    the server computer connecting the participant computers to cloud-based virtual machines;

the server computer creating phantom participants as system agents running on the virtual machines, with a single system agent associated with each individual participant computer;

the virtual machines opening a browser;

the virtual machines logging into the platform on behalf of the phantom participants via the browser in a first browser tab;

the virtual machines initiating streaming software via the browser in a second browser tab;

wherein the streaming software is configured to capture and stream content from the first browser tab to the platform;

the virtual machines receiving audio and video from the participants computers;

the streaming software conveying the audio and video to viewers via the platform;

wherein participants are matched together in pairs during one-on-one audio/visual speed-dates simultaneously; and the platform displaying live streams of all participants to all viewers via viewer computers simultaneously.

9. The system of claim 8, wherein multiple browser tabs are employed on the virtual machines.

10. The system of claim 8, wherein the audio and video exhibit sub-second latency.

11. The system of claim 8, wherein the virtual machines are running on a server computer connected to the internet.

12. The system of claim 11, further comprising:

the server computer matching participants together in pairs for speed-dates according to an algorithm;

the algorithm dictating the order in which participants are paired together; and wherein parameters of the algorithm dictate the pairing of participants, the parameters including: gender, age, religion, ethnicity, location, and viewer input via viewer voting.

13. The system of claim 12, wherein the number of viewers exceeds 10,001.

14. The system of claim 11, further comprising:

a timer running on the server computer;

the timer showing the remaining time of the speed-dates;

the server computer terminating all speed dates upon expiration of the timer;

the platform displaying to the participants a selection screen, selections available on the selection screen are chosen from the group: "couple," "cut," and "connect;"

wherein upon selection of "couple" by a participant on the selection screen, the participant is informing the server and the viewers that the participant wishes to romantically connect with the paired participant;

wherein upon selection of "cut" by a participant on the selection screen, the participant is informing the server and the viewers that the participant does not wish to pursue the connection with the paired participant romantically; and wherein upon selection of "connect" by a participant on the selection screen, the participant is informing the server and the viewers that the participant wishes to pursue the connection as friends.

\* \* \* \* \*